United States Patent
Liu et al.

(10) Patent No.: US 11,652,577 B2
(45) Date of Patent: May 16, 2023

(54) WIRELESS COMMUNICATION SYSTEM AND WIRELESS COMMUNICATION METHOD

(71) Applicant: Shanghai WUQI Microelectronics Co., Ltd., Shanghai (CN)

(72) Inventors: Da Liu, Shanghai (CN); Zhiyong Xu, Shanghai (CN)

(73) Assignee: SHANGHAI WUQI MICROELECTRONICS CO., LTD., Shanghai (CN)

( * ) Notice: Subject to any disclaimer, the term of this patent is extended or adjusted under 35 U.S.C. 154(b) by 0 days.

(21) Appl. No.: 17/453,483

(22) Filed: Nov. 3, 2021

(65) Prior Publication Data

US 2023/0095136 A1  Mar. 30, 2023

(30) Foreign Application Priority Data

Sep. 24, 2021 (CN) .......................... 202111123131.5

(51) Int. Cl.
*H04L 1/18* (2023.01)
*H04L 1/1812* (2023.01)
*H04W 76/10* (2018.01)
*H04L 1/00* (2006.01)

(52) U.S. Cl.
CPC .......... *H04L 1/1819* (2013.01); *H04L 1/0061* (2013.01); *H04L 1/0072* (2013.01); *H04W 76/10* (2018.02)

(58) Field of Classification Search
CPC ... H04L 1/1607; H04L 1/1912; H04L 1/1819; H04L 1/0061; H04L 1/0072
See application file for complete search history.

(56) References Cited

U.S. PATENT DOCUMENTS

| | | | |
|---|---|---|---|
| 7,986,623 B2 * | 7/2011 | Bardalai | H04L 47/765 370/235 |
| 2010/0022190 A1 * | 1/2010 | Laroia | H04W 40/12 455/67.11 |
| 2020/0177984 A1 * | 6/2020 | Tong | H04R 5/033 |

* cited by examiner

*Primary Examiner* — Shelly A Chase
(74) *Attorney, Agent, or Firm* — Hauptman Ham, LLP

(57) ABSTRACT

A system includes a first node, a second node, and a third node, wherein the first node establishes a wireless communication link with the second node to perform wireless communication, and forwards connection information of the wireless communication to the third node; and the third node receives, by listening on the wireless communication link based on the connection information, transmission data sent by the second node to the first node. If an error occurs when the third node receives the transmission data sent by the second node to the first node, the third node interferes with the first node's reception of the transmission data sent by the second node, so that an error is caused when the first node receives the transmission data sent by the second node, and the second node is triggered to perform retransmission.

7 Claims, 3 Drawing Sheets

---

S1: Determining whether an error occurs when a third node receives transmission data sent by a second node to a first node, wherein if yes, S2 is performed S2: Interfering, by the third node, with the first node's reception of the transmission data sent by the second node

WIRELESS COMMUNICATION SYSTEM AND WIRELESS COMMUNICATION METHOD

RELATED APPLICATIONS

The present application claims priority from Chinese Application Number 202111123131.5, filed Sep. 24, 2021, the disclosure of which is hereby incorporated by reference herein in its entirety.

TECHNICAL FIELD

The present disclosure relates to the field of wireless communication technologies, and particularly relates to a wireless communication system and a wireless communication method.

BACKGROUND

Wireless communication refers to communication among a plurality of nodes based on long-, or short-distance transmission without conductors or cables. Wireless communication has spread into all aspects of people's life and work, such as WLAN, UWB, Bluetooth, wideband satellite system, and digital TV.

There are a variety of types of wireless communication systems, and they have their own advantages. In a wireless communication system, a plurality of nodes is set and work together. A common connection manner of wireless communication, especially in the field of Bluetooth headsets, is as follows: one node acquires data transmitted between other nodes by listening on communication between these nodes. For example, a first node establishes a wireless communication link with a second node to perform wireless communication, and also establishes a wireless communication link with a third node for wireless communication; the first node sends connection information of the wireless communication with the second node to the third node; and the third node acquires, by listening on the wireless communication link between the first node and the second node based on the connection information, transmission data sent by the second node to the first node. Wireless communication can be directly performed between the first node and the second node, but cannot be directly performed between the second node and the third node, which adversely affects running of a feedback mechanism and a retransmission mechanism for data transmission in wireless communication, and further reduces transmission quality. For example, the second node sends the transmission data to the first node, and the third node receives the transmission data via listening. The first node feeds back an acknowledge character to the second node if it successfully receives the transmission data; or the first node feeds back a negative acknowledge character to the second node if it fails to receive the transmission data, thereby enabling the second node to perform data retransmission. However, the third node cannot directly give feedback to the second node. If the third node fails to receive the transmission data via listening, but the first node successfully receives the transmission data, the second node does not perform retransmission.

To resolve this problem, a researcher proposes the following method for synthesizing feedback results. After receiving the transmission data, the third node gives feedback to the first node in an idle period of a receiving slot; and the first node synthesizes its own receiving status and a receiving status of the third node, and feeds back an acknowledge character to the second node if both the first node and the third node successfully receive the transmission data; or the first node feeds back a negative acknowledge character to the second node if either of the two nodes fails to receive the transmission data, thereby enabling the second node to perform data retransmission. This avoids impact on running of the feedback mechanism and the retransmission mechanism for data transmission in wireless communication, and guarantees transmission quality.

However, under normal circumstances, most of the transmission data can be successfully received, which means that only a small amount of the transmission data needs to be retransmitted. Therefore, in most cases, actions performed within the idle period of the slot not only are useless, but also waste resources and increase costs. In addition, for some wireless communication systems, for example, a wireless communication system of a Bluetooth headset, there is a certain tolerance to packet loss. Even under a circumstance in which packet loss is caused by RF interference, the Bluetooth headset can still achieve good audio quality, provided that some good packet concealment algorithms are used.

SUMMARY

A first objective of the present disclosure is to provide a wireless communication system, which can guarantee running of a feedback mechanism and a retransmission mechanism for data transmission in wireless communication, lower costs, and reduce resource waste.

A first basic solution of the present disclosure is as follows. The wireless communication system includes a first node, a second node, and a third node, wherein the first node establishes a wireless communication link with the second node to perform wireless communication, and forwards connection information of the wireless communication to the third node; and the third node receives, by listening on the wireless communication link based on the connection information, transmission data sent by the second node to the first node, wherein if an error occurs when the third node receives the transmission data sent by the second node to the first node, the third node interferes with the first node's reception of the transmission data sent by the second node.

Benefits of the first basic solution are as follows: The wireless communication system includes the first node, the second node, and the third node, wherein the first node establishes the wireless communication link with the second node to perform the wireless communication, and forwards the connection information of the wireless communication to the third node; and the third node receives, by listening on the wireless communication link based on the connection information, the transmission data sent by the second node to the first node. Wireless communication can be directly performed between the first node and the second node, but cannot be directly performed between the second node and the third node. If an error occurs when the third node receives the transmission data sent by the second node to the first node, the third node interferes with the first node's reception of the transmission data sent by the second node, so that the first node's successful reception of the transmission data is impacted, and an error is caused when the first node receives the transmission data sent by the second node. Further, the first node feeds back a negative acknowledge character to the second node, the retransmission mechanism is triggered, and the second node performs retransmission to send the transmission data again. In addition, because the second node and the first node directly perform the wireless communication with each other, if the third node successfully receives the transmission data, but an error occurs when the first node receives the transmission data, the first node also feeds back a negative acknowledge character to the second node, the retransmission mechanism is triggered, and the second node performs retransmission. However, if both the third node and the first node successfully receive the transmission data, the first node feeds back an acknowledge character to the second node. This avoids impact on running of the feedback mechanism and the retransmission mechanism for data transmission in wireless communication, and guarantees transmission quality.

Under normal circumstances, most of the transmission data can be successfully received by the third node and the first node. In this case, the system performs feedback normally according to the protocol of an underlying wireless system. For a small amount of the transmission data that fails to be received by the third node and/or the first node, feedback and retransmission are performed based on the above content. Therefore, the third node and the first node do not need to perform integrated feedback once or multiple times in each idle period of the slot, which reduces resource waste and lowers costs.

Further, the third node receives the transmission data sent by the second node to the first node, and verifies the transmission data from head to tail to detect whether the transmission data has an error or whether an error occurs during the transmission.

The benefit is as follows. The third node verifies the transmission data from head to tail to detect whether the transmission data has the error or whether the error occurs during the transmission. Both a result showing that the transmission data has the error and a result showing that the error occurs during the transmission indicate that the third node fails to receive the transmission data and that interference is performed subsequently to ensure integrity of data transmission. The third node verifies the transmission data from head to tail, so that the third node verifies a header when receiving the header, and if the header has the error or the error occurs during the transmission, the third node may skip receiving the rest part of the transmission data and directly perform interference.

Further, the third node interferes with the first node's reception of the transmission data sent by the second node includes: switching the third node from a receiving mode to a sending mode, and sending an interference signal to the first node by the third node.

The benefit is as follows. The third node directly performs wireless communication with the first node, and learns the connection information of the wireless communication between the first node and the second node. Therefore, to interfere with the first node's reception of the transmission data sent by the second node, the third node needs only to switch from the receiving mode to the sending mode, and send the interference signal to the first node. This allows the operation to be simple and convenient, and avoids extra setting.

Further, the wireless communication is Bluetooth communication; the transmission data is a data packet; the data packet includes three parts: an access code, a packet header, and data; the third node sequentially verifies the access code, the packet header, and the data; and when detecting that any part has an error or that an error occurs during the transmission, the third node switches from a receiving mode to a sending mode, and sends an interference signal to the first node.

The benefit is as follows. In the Bluetooth communication, the third node sequentially verifies the access code, the packet header, and the data. When detecting that any part has an error or that an error occurs during the transmission, the third node switches from the receiving mode to the sending mode, and sends the interference signal to the first node, thereby performing interference as soon as possible, and increasing a probability of interference success.

Further, the access code, the packet header, and the data are sequentially verified by a channel access code, header error check HEC, and payload check using CRC, respectively.

The benefit is as follows. Different parts of the data packet use different verification manners. However, the verification manners are common verification manners specific to the different parts, so as to ensure that the verification is accurate.

Further, after completing reception of the transmission data, the first node keeps in a receiving mode for a preset time period within a receiving slot.

The benefit is as follows. After completing reception of the transmission data, the first node keeps in the receiving mode for the preset time period within the receiving slot. Therefore, the interference signal sent when the third node detects an error or a transmission error by verifying the data can also be received by the first node. That is, the first node receives more data than the transmission data that can be sent by the second node. The first node uses the transmission data received from the second node and the third node as a whole data packet, and checks CRC or integrity of the whole data packet, thereby guaranteeing the interference effect of the interference signal.

A second objective of the present disclosure is to provide a wireless communication method, which can guarantee running of a feedback mechanism and a retransmission mechanism for data transmission in wireless communication, lower costs, and reduce resource waste.

A second basic solution of the present disclosure is as follows. The wireless communication method is applied to a communication network including a first node, a second node, and a third node, wherein the first node establishes a wireless communication link with the second node to perform wireless communication, and forwards connection information of the wireless communication to the third node; the third node receives, by listening on the wireless communication link based on the connection information, transmission data sent by the second node to the first node; and the method includes the following steps:

S1, determining whether an error occurs when the third node receives the transmission data sent by the second node to the first node, wherein if yes, S2 is performed; and S2, interfering, by the third node, with the first node's reception of the transmission data sent by the second node.

Benefits of the second basic solution are as follows. The wireless communication method is applied to the communication network including the first node, the second node, and the third node, wherein the first node establishes the wireless communication link with the second node to perform the wireless communication, and forwards the connection information of the wireless communication to the third node; and the third node receives, by listening on the wireless communication link based on the connection information, the transmission data sent by the second node to the first node. Wireless communication can be directly performed between the first node and the second node, but cannot be directly performed between the second node and the third node. Whether an error occurs when the third node receives the transmission data sent by the second node to the first node is determined. If the error occurs when the third node receives the transmission data, the first node's reception of the transmission data sent by the second node is interfered, so that the first node's successful reception of the transmission data is impacted, and an error is caused when the first node receives the transmission data sent by the second node. Further, the first node feeds back a negative acknowledge character to the second node, the retransmission mechanism is triggered, and the second node performs retransmission to send the transmission data again. In addition, because the first node and the second node directly perform the wireless communication with each other, if the third node successfully receives the transmission data, but an error occurs when the first node receives the transmission data, the first node also feeds back a negative acknowledge character to the second node, the retransmission mechanism is triggered, and the second node performs retransmission. However, if both the third node and the first node successfully receive the transmission data, the first node feeds back an acknowledge character to the second node. This avoids impact on running of the feedback mechanism and the retransmission mechanism for data transmission in wireless communication, and guarantees transmission quality.

Under normal circumstances, most of the transmission data can be successfully received by the third node and the first node. In this case, the method performs feedback normally according to the protocol of an underlying wireless system. For a small amount of the transmission data that fails to be received by the third node and/or the first node, feedback and retransmission are performed based on the above content. Therefore, the third node and the first node do not need to perform integrated feedback once or multiple times in each idle period of the slot, which reduces resource waste and lowers costs.

Further, S1 includes:

S101, receiving, by the third node, the transmission data sent by the second node to the first node; and S102, verifying the transmission data from head to tail by the third node to detect whether the transmission data has an error or whether an error occurs during the transmission, wherein if yes, S2 is performed.

The benefit is as follows. The third node verifies the transmission data from head to tail to detect whether the transmission data has the error or whether the error occurs during the transmission. Both a result showing that the transmission data has the error and a result showing that the error occurs during the transmission indicate that the third node fails to receive the transmission data and that S2 is performed to ensure integrity of data transmission.

Further, S2 includes:

S201, switching the third node from a receiving mode to a sending mode; and

S202, sending an interference signal to the first node by the third node.

The benefit is as follows. The third node directly performs wireless communication with the first node, and learns the connection information of the wireless communication between the first node and the second node. Therefore, to interfere with the first node's reception of the transmission data sent by the second node, the third node needs only to switch from the receiving mode to the sending mode, and send the interference signal to the first node. This allows the operation to be simple and convenient, and avoids extra setting.

Further, the wireless communication is Bluetooth communication; the transmission data is a data packet; the data packet includes three parts: an access code, a packet header, and data; and S102 includes: sequentially verifying the access code, the packet header, and the data by the third node by using a channel access code, header error check HEC, and payload check using CRC, respectively, wherein S2 is performed if a result shows that any part has an error or that an error occurs during the transmission; and after completing reception of the transmission data, the first node keeps in a receiving mode for a preset time period within a receiving slot.

The benefit is as follows. Different parts of the data packet use different verification manners. However, common verification manners specific to the different parts are used as the verification manners, so as to ensure that the verification is accurate.

After completing reception of the transmission data, the first node keeps in the receiving mode for the preset time period within the receiving slot. Therefore, the interference signal sent when the third node detects an error or a transmission error by verifying the data can also be received by the first node. That is, the first node receives more data than the transmission data that can be sent by the second node. The first node uses the transmission data received from the second node and the third node as a whole data packet, and checks CRC or integrity of the whole data packet, thereby guaranteeing the interference effect of the interference signal.

DETAILED DESCRIPTION

The following provides further descriptions in detail with reference to specific embodiments.

Embodiment 1

Figure 1:
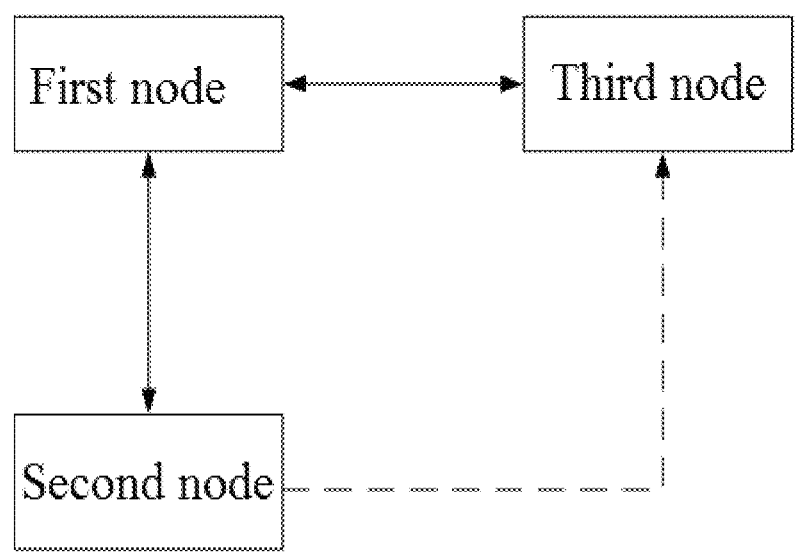
FIG. 1 is a schematic diagram of network connection of a wireless communication system according to an embodiment of the present disclosure.

As basically shown in FIG. 1, this embodiment is as follows. A wireless communication system includes a first node, a second node, and a third node, wherein the first node establishes a wireless communication link with the second node to perform wireless communication, and forwards connection information of the wireless communication to the third node; and the third node receives, by listening on the wireless communication link based on the connection information, transmission data sent by the second node to the first node. In other words, the first node and the second node directly perform the wireless communication with each other, as shown by a solid line in FIG. 1; but the second node and the third node cannot directly perform wireless communication with each other, as shown by a dashed line in FIG. 1. The third node can receive, only by listening on the communication between the first node and the second node, the transmission data sent by the second node to the first node, thereby performing the wireless communication.

If an error occurs when the third node receives the transmission data sent by the second node to the first node, the third node interferes with the first node's reception of the transmission data sent by the second node, so that an error is caused when the first node receives the transmission data sent by the second node, and the second node is triggered to perform retransmission. Specifically, the third node receives, by listening on the communication between the first node and the second node, the transmission data sent by the second node to the first node, and verifies the transmission data from head to tail to check whether the transmission data has an error or whether an error occurs during the transmission. If the transmission data has the error or the error occurs during the transmission, the third node switches from a receiving mode to a sending mode, and sends an interference signal to the first node, so that the error is caused when the first node receives the transmission data sent by the second node, and the second node is triggered to perform retransmission.

Figure 2:
FIG. 2 is a schematic structural diagram of a data packet of a wireless communication system according to an embodiment of the present disclosure.

If the wireless communication is Bluetooth communication, the transmission data is a data packet. As shown in FIG. 2, the data packet includes three parts: an access code (ACCESS CODE in the figure), a packet header (HEADER in the figure), and data (PAYLOAD in the figure). The data packet is a standard data packet compliant with the Bluetooth specification. Specifically, the third node verifying the transmission data from head to tail is: the third node sequentially verifies the access code, the packet header, and the data by a channel access code, header error check HEC, and payload check using CRC, respectively; and when detecting that any part has an error or that an error occurs during the transmission, the third node switches from a receiving mode to a sending mode, and sends an interference signal to the first node, wherein after completing reception of the transmission data, the first node keeps in the receiving mode for a preset time period within a receiving slot, wherein the preset time period does not exceed the receiving slot. In other words, in the Bluetooth communication, after completing reception of the data in the data packet, the first node keeps in the receiving mode for the preset time period within the receiving slot. Therefore, the interference signal sent when the third node detects an error or a transmission error by verifying the data can also be received by the first node. That is, the first node receives more data than the transmission data that can be sent by the second node. The first node uses the transmission data received from the second node and the third node as a whole data packet, and checks CRC or integrity of the whole data packet, thereby guaranteeing the interference effect of the interference signal.

A working principle of the above is as follows. The third node receives, by listening on the communication between the first node and the second node, the transmission data sent by the second node to the first node. If both the third node and the first node successfully receive the transmission data, the first node feeds back an acknowledge character to the second node. If the first node fails to receive the transmission data, no matter whether the third node successfully receives the transmission data, the first node feeds back a negative acknowledge character to the second node, and the second node performs retransmission after receiving the negative acknowledge character. If the third node fails to receive the transmission data, that is, an error occurs when the third node receives the transmission data sent by the second node to the first node, the third node interferes with the first node's reception of the transmission data sent by the second node, so that an error is caused when the first node receives the transmission data sent by the second node, the first node feeds back a negative acknowledge character to the second node, and the second node is triggered to perform retransmission. This avoids impact on running of the feedback mechanism and the retransmission mechanism for data transmission in wireless communication, and guarantees transmission quality. In addition, under normal circumstances, most of the transmission data can be successfully received by the third node and the first node. In this case, the system performs feedback normally according to the protocol of an underlying wireless system; and for a small amount of the transmission data that fails to be successfully received by the third node and/or the first node, feedback and retransmission are performed based on the above content. Therefore, the third node and the first node do not need to perform integrated feedback once or multiple times in each idle period of the slot, which reduces re source waste and lowers costs.

Figure 3:
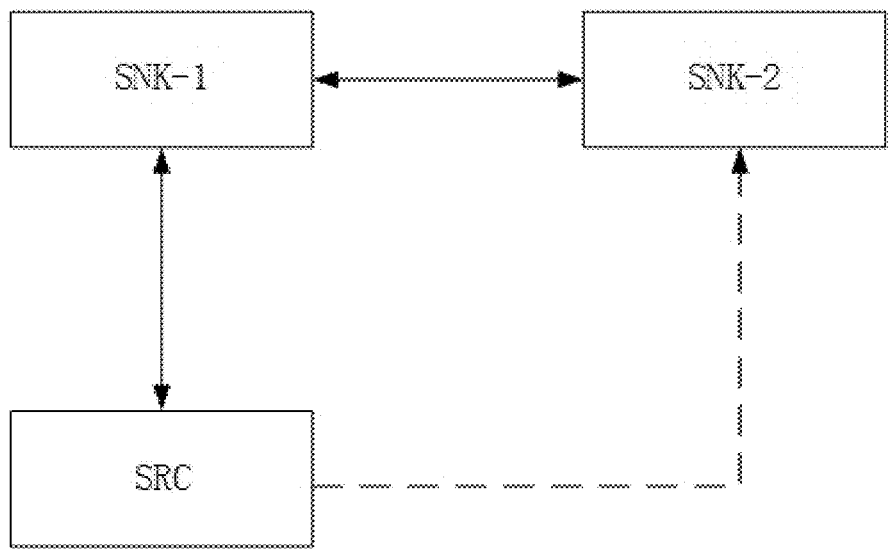
FIG. 3 is a schematic diagram of connection between a true wireless Bluetooth headset and a mobile phone in a wireless communication system according to an embodiment of the present disclosure.
Figure 4:
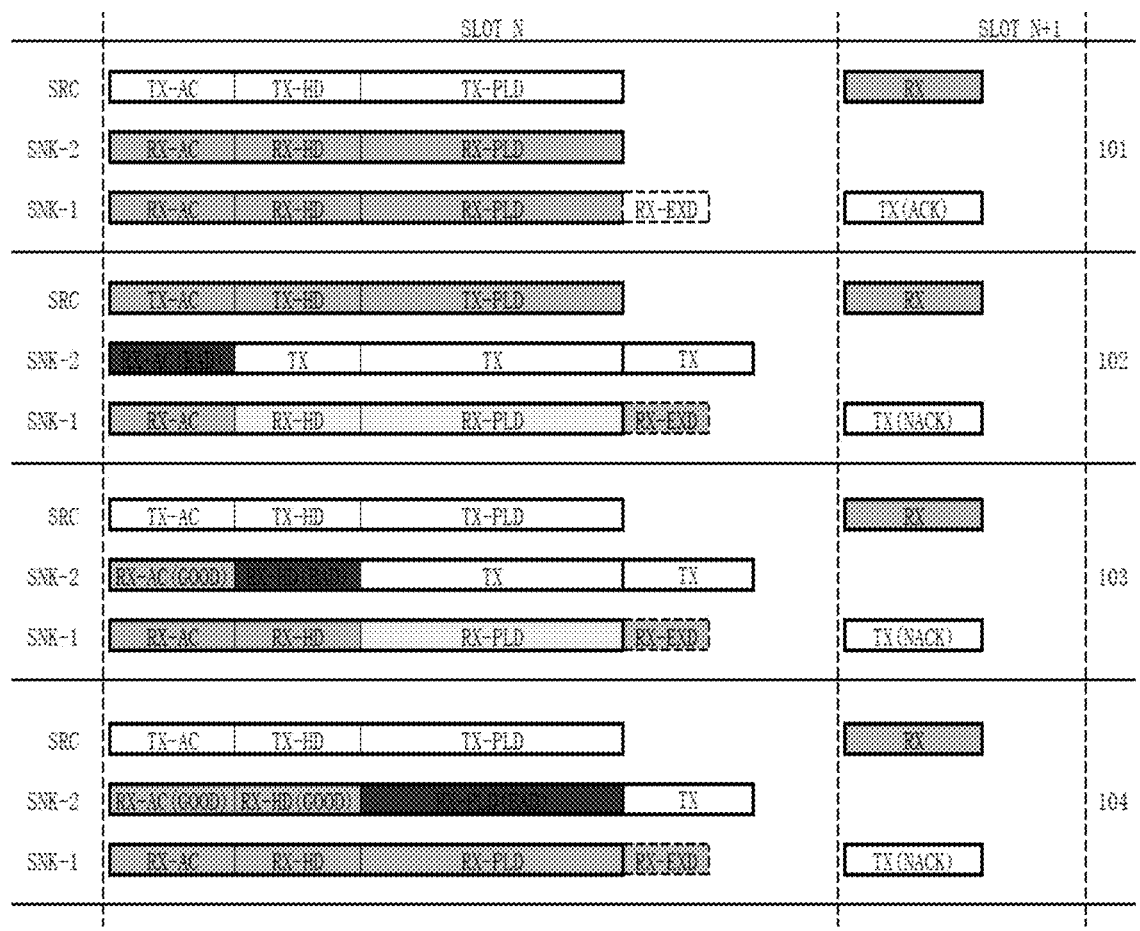
FIG. 4 is a schematic diagram of a status of transmission between a true wireless Bluetooth headset and a mobile phone in a wireless communication system according to an embodiment of the present disclosure.

As shown in FIG. 3, this embodiment uses a wireless communication system for connection between a true wireless Bluetooth headset and a mobile phone as an example. As shown in FIG. 4, abbreviations in the accompanying drawings are described as below:

SLOT N: denotes a slot.

SLOT N+1: denotes a next slot.

SRC: denotes a second node, and also denotes sound source equipment, such as a mobile phone.

SNK-1: denotes a first node, and also denotes a main headphone of the true wireless Bluetooth headset.

SNK-2: denotes a third node, and also denotes a subheadphone of the true wireless Bluetooth headset.

TX-AC: indicates that SRC sends an access code.

TX-HD: indicates that SRC sends a packet header.

TX-PLD: indicates that SRC sends data, that is, SRC sends payload.

RX-AC: indicates that SNK-1 or SNK-2 receives the access code sent by SRC.

RX-HD: indicates that SNK-1 or SNK-2 receives the packet header sent by SRC.

RX-PLD: indicates that SNK-1 or SNK-2 receives the payload sent by SRC.

RX-AC (BAD): indicates that SNK-2 fails to receive the access code sent by SRC.

RX-HD (BAD): indicates that SNK-2 fails to receive the packet header sent by SRC.

RX-PLD (BAD): indicates that SNK-2 fails to receive the payload.

RX-EXD: indicates a period for which a receiver of SNK-1 is additionally enabled after TX of SRC is completed, to provide an opportunity for SNK-2 to send an interference signal. Then, SNK-1 checks CRC and integrity of an entire data packet. If the interference signal sent by SNK-2 is received by SNK-1 within RX-EXD, SNK-1 uses data received from SRC and the interference signal received from SNK-2 as a data packet, and verifies the data packet. In this case, because the data packet includes data of the interference signal, the verification fails. If the interference signal sent by SNK-2 is not received by SNK-1 within RX-EXD, SNK-1 uses data received from SRC as a data packet, and verifies the data packet. In this case, whether the verification succeeds depends on whether SNK-1 receives the date correctly.

TX: indicates that SNK-2 sends the interference signal to impact SNK-1's reception of the data packet from SRC.

TX (ACK): indicates that SNK-1 sends ACK (acknowledge character) to SRC.

TX (NACK): indicates that SNK-2 sends NACK (negative acknowledge character) to SRC.

TX (ACK/NACK): indicates that SNK-1 may send ACK or NACK to SRC.

In case 101, both SNK-1 and SNK-2 successfully receive the data packet sent by SRC, and SRC receives ACK fed back by SNK-1.

In case 102, if SNK-2 fails to identify the access code of SRC, SNK-2 immediately switches from an RX mode (receiving mode) to a TX mode (sending mode) to send a randomly constructed interference signal for preventing SNK-1 from correctly receiving the rest part of the data packet. Although SNK-2 may not know how many slots SLOT N can last for, because a length of a data packet is fixed within certain duration, a length of SLOT N can be calculated based on packets that are previously received successfully. SNK-1 sends NACK to SRC within SLOT N+1.

In case 103, SNK-2 correctly identifies the access code, but fails to receive the packet header. SNK-2 performs switching from the RX mode to the TX mode at the beginning of TX-PLD to send a randomly constructed data packet, and SNK-2 keeps in the TX mode close to the end of SLOT. Although SNK-2 may not know how many slots SLOT N can last for, because a length of a data packet is fixed within certain duration, a length of SLOT N can be calculated based on packets that are previously received successfully. SNK-2 sends NACK to SRC within SLOT N+1.

In case 104, SNK-2 correctly identifies the access code and the packet header of SRC, but fails to receive the data. SNK-2 switches to the TX mode when the reception ends, and sends some data, namely, an interference signal, that can be easily identified by SNK-1. SNK-1 receives more data than the data packet that can be sent by SRC, and continuously receives data bits from SNK-2 in a manner similar to receiving data from SRC until a timer expires. Then, SNK-1 uses data received from SRC and SNK-2 as a whole data packet, and checks CRC or integrity of the whole data packet. Because checking the CRC or integrity fails, SNK-2 sends NACK to SRC within SLOT N+1. However, if SNK-2 does not send the interference signal, whether checking passes only depends on whether SNK-1 correctly receives the data.

In cases 102, 103, and 104, when failing to correctly receive the data packet sent by SRC, SNK-2 interferes with SNK-1's reception to enable SRC to send the packet again. However, the interference may fail. Application is not impacted even when the interference fails. Because packet concealment algorithms can be used to compensate for data in actual application, good audio quality can still be achieved.

Embodiment 2

Figure 5:
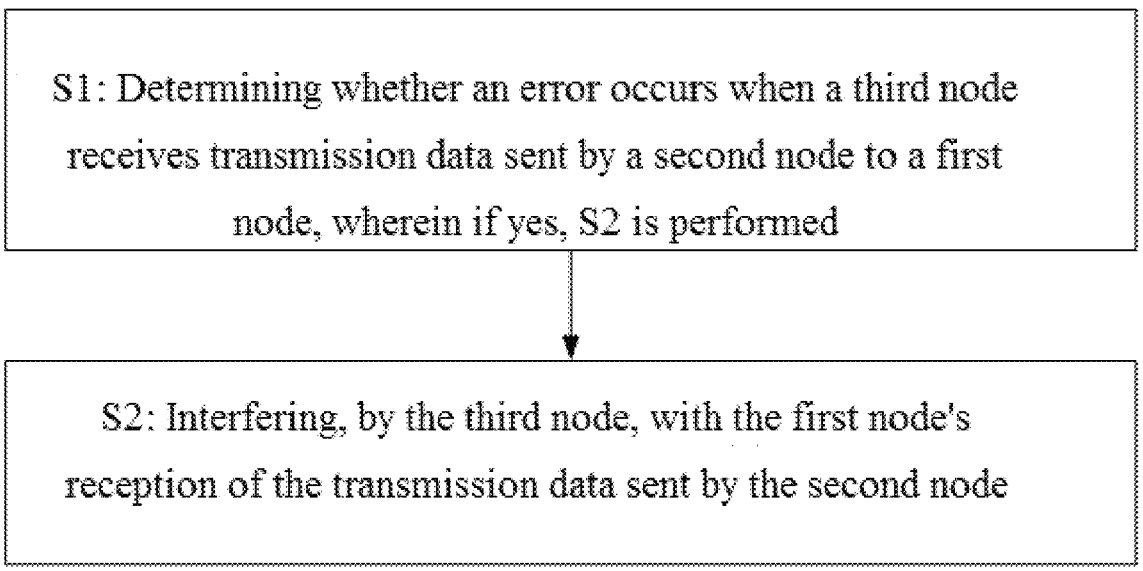
FIG. 5 is a schematic flowchart of a wireless communication method according to an embodiment of the present disclosure.

As basically shown in FIG. 5, this embodiment is as follows. A wireless communication method is applied to a communication network including a first node, a second node, and a third node, wherein the first node establishes a wireless communication link with the second node to perform wireless communication, and forwards connection information of the wireless communication to the third node; and the third node receives, by listening on the wireless communication link based on the connection information, transmission data sent by the second node to the first node. In the communication network, the first node establishes the wireless communication link with the second node to directly perform the wireless communication, and forwards the connection information of the wireless communication to the third node; but the second node and the third node cannot directly perform wireless communication with each other. The third node can receive, only by listening on the wireless communication link based on the connection information, the transmission data sent by the second node to the first node. The method includes the following steps.

In S1, whether an error occurs when the third node receives the transmission data sent by the second node to the first node is determined, wherein if yes, S2 is performed. S1 specifically includes the following sub-steps.

In S101, the third node receives the transmission data sent by the second node to the first node.

In S102, the third node verifies the transmission data from head to tail to detect whether the transmission data has an error or whether an error occurs during the transmission, wherein if yes, S2 is performed.

In S2, the third node interferes with the first node's reception of the transmission data sent by the second node, wherein due to the interference, an error is caused when the first node receives the transmission data sent by the second node, and the second node is triggered to perform retransmission. S2 specifically includes the following sub-steps:

In S201, the third node switches from a receiving mode to a sending mode.

In S202, the third node sends an interference signal to the first node, wherein due to the interference, an error is caused when the first node receives the transmission data sent by the second node, and the second node is triggered to perform retransmission.

The wireless communication is Bluetooth communication. The transmission data is a data packet. The data packet includes three parts: an access code, a packet header, and data. S102 includes: sequentially verifying the access code, the packet header, and the data by the third node by using a channel access code, header error check HEC, and payload check using CRC, respectively, wherein S2 is performed if a result shows that any part has an error or that an error occurs during the transmission; and after the first node completes reception of the transmission data, keeping the first node in a receiving mode for a preset time period within a receiving slot, wherein the preset time period does not exceed the receiving slot. In other words, in the Bluetooth communication, after completing reception of the data in the data packet, the first node keeps in the receiving mode for the preset time period within the receiving slot. Therefore, the interference signal sent when the third node detects an error or a transmission error by verifying the data can also be received by the first node. That is, the first node receives more data than the transmission data that can be sent by the second node. The first node uses the transmission data received from the second node and the third node as a whole data packet, and checks CRC or integrity of the whole data packet, thereby guaranteeing the interference effect of the interference signal.

A working principle of the above is as follows. The third node receives the transmission data sent by the second node to the first node. If both the third node and the first node successfully receive the transmission data, the first node feeds back an acknowledge character to the second node. If the first node fails to receive the transmission data, no matter whether the third node successfully receives the transmission data, the first node feeds back a negative acknowledge character to the second node, and the second node performs retransmission after receiving the negative acknowledge character. If the third node fails to receive the transmission data, that is, an error occurs when the third node receives the transmission data sent by the second node to the first node, the third node interferes with the first node's reception of the transmission data sent by the second node, so that an error is caused when the first node receives the transmission data sent by the second node, the first node feeds back a negative acknowledge character to the second node, and the second node is triggered to perform retransmission. This avoids impact on running of the feedback mechanism and the retransmission mechanism for data transmission in wireless communication, and guarantees transmission quality. In addition, under normal circumstances, most of the transmission data can be successfully received by the third node and the first node. In this case, the system performs feedback normally according to the protocol of an underlying wireless system. For a small amount of the transmission data that fails to be successfully received by the third node and/or the first node, feedback and retransmission are performed based on the above content. Therefore, the third node and the first node do not need to perform integrated feedback once or multiple times in each idle period of the slot, which reduces resource waste and lowers costs.

The foregoing descriptions are merely embodiments of the present disclosure. General knowledge well known in the solution, such as specific structures and features, is not described in detail herein. People of ordinary skill in the art know all ordinary technical knowledge in the field of the present disclosure prior to the filing date or priority date, can learn all prior art in the field, and has an ability to apply conventional experimental methods prior to the dates. Under enlightenment of the present disclosure, the people of ordinary skill in the art may complete and implement the solution with reference to their own abilities. Some typical well-known structures or methods should not be an obstacle to implementation of the present disclosure by the people of ordinary skill in the art. It should be noted that the people of ordinary skill in the art may make several variants and improvements without departing from the structure of the present disclosure. These variants and improvements shall fall within the protection scope of the present disclosure, and cannot impact the implementation effect of the present disclosure and the practicability of the patent. The protection scope of the present disclosure shall be subject to the content of the claims. Descriptions of specific embodiments in the Description can be used to interpret the content of the claims.

What is claimed is:

1. A wireless communication system, comprising: a first node, a second node, and a third node, wherein the first node establishes a wireless communication link with the second node to perform wireless communication, and forwards connection information of the wireless communication to the third node; and the third node receives, by listening on the wireless communication link based on the connection information, transmission data sent by the second node to the first node, wherein if an error occurs when the third node receives the transmission data sent by the second node to the first node, the third node interferes with the first node's reception of the transmission data sent by the second node,
   wherein the wireless communication is Bluetooth communication; the transmission data is a data packet; the data packet comprises three parts: an access code, a packet header, and data; the third node sequentially verifies the access code, the packet header, and the data; and when detecting any part has an error or an error occurs during the transmission, the third node switches from a receiving mode to a sending mode, and sends an interference signal to the first node, and
   the access code, the packet header, and the data are sequentially verified by a channel access code, header error check HEC, and payload check using CRC, respectively.

2. The wireless communication system according to claim 1, wherein the third node receives the transmission data sent by the second node to the first node, and verifies the transmission data from head to tail to detect whether the transmission data has an error or whether an error occurs during the transmission.

3. The wireless communication system according to claim 1, wherein the third node interferes with the first node's reception of the transmission data sent by the second node comprises: switching the third node from a receiving mode to a sending mode, and sending an interference signal by the third node to the first node.

4. The wireless communication system according to claim 1, wherein after completing reception of the transmission data, the first node keeps in a receiving mode for a preset time period within a receiving slot.

5. A wireless communication method, applied to a communication network comprising a first node, a second node, and a third node, wherein the first node establishes a wireless communication link with the second node to perform wireless communication, and forwards connection information of the wireless communication to the third node; the third node receives, by listening on the wireless communication link based on the connection information, transmission data sent by the second node to the first node; and the method comprises the following steps:
   S1, determining whether an error occurs when the third node receives the transmission data sent by the second node to the first node, wherein if yes, S2 is performed; and
   S2, interfering, by the third node, with the first node's reception of the transmission data sent by the second node,
   wherein the wireless communication is Bluetooth communication; the transmission data is a data packet; and the data packet comprises three parts: an access code, a packet header, and data; and
   S102 comprises: sequentially verifying the access code, the packet header, and the data by the third node by a channel access code, header error check HEC, and payload check using CRC, respectively, wherein S2 is performed if a result shows any part has an error or an error occurs during the transmission; and
   after completing reception of the transmission data, the first node keeps in a receiving mode for a preset time period within a receiving slot.

6. The wireless communication method according to claim 5, wherein S1 comprises:
   S101, receiving, by the third node, the transmission data sent by the second node to the first node; and
   S102, verifying the transmission data from head to tail by the third node to detect whether the transmission data has an error or whether an error occurs during the transmission, wherein if yes, S2 is performed.

7. The wireless communication method according to claim 5, wherein S2 comprises:
   S201, switching the third node from a receiving mode to a sending mode; and S202, sending an interference signal to the first node by the third node.

* * * * *